Patented Apr. 22, 1941

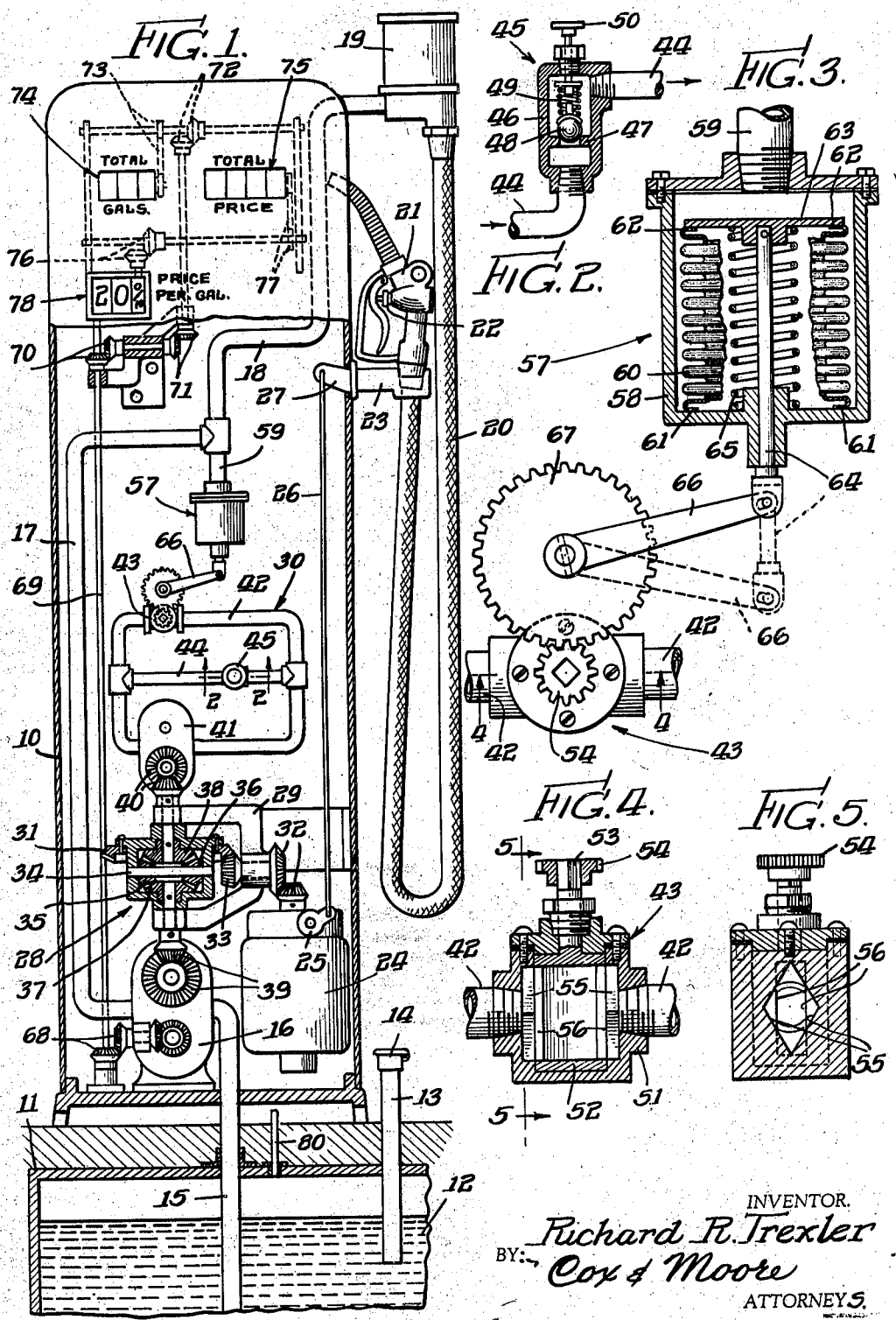

2,239,207

UNITED STATES PATENT OFFICE 2,239,207

LIQUID DISPENSING APPARATUS

Richard R. Trexler, Evanston, Ill.

Application October 29, 1938, Serial No. 237,593

16 Claims. (Cl. 221—95)

This invention relates to liquid dispensing apparatus and more particularly to apparatus of the type adapted to dispense gasoline or the like.

It is an object of the invention to provide liquid dispensing apparatus of improved and simplified construction and of improved and maintained accuracy.

More specifically, it is an object of the invention to provide a satisfactory operating mechanism for liquid dispensing apparatus wherein the movements of the liquid propelling pump may be made directly proportional to the actual liquid flow whereby the pump itself may be used to actuate the register mechanism or other recording or indicating elements of the apparatus, meter mechanisms or the like being eliminated.

A further object of the invention is to provide a liquid dispensing apparatus wherein all churning of the liquid or admixture with air during the passage of the liquid through the apparatus is avoided whereby the underground storage tank or other source of supply may be used for the elimination of air, other air elimination means being unnecessary.

In accordance with the invention the liquid propelling pump is operated from a constantly operating power source, such as an electric motor; and instantaneously operable and readily controllable means is provided for instantaneously diverting from the pump all or any predetermined amount of the motor power when it is desired to reduce the pump speed or stop the pump during dispensing operations. By this means the movements of the liquid propelling pump are rendered accurately proportional to the flow of liquid propelled thereby, whether the pump be operated at full speed, part speed, or intermittently.

Further objects, advantages and features of the invention will be apparent from the following specification when taken in connection with the accompanying drawing wherein a preferred embodiment of the invention is illustrated.

In the drawing, wherein like reference numerals refer to like parts throughout:

Fig. 1 is a general assembly view, partly in section, of a dispensing apparatus embodying the invention.

Fig. 2 is a partial detail view of the by-pass valve for the power diverting mechanism, on the line 2—2 of Fig. 1.

Fig. 3 is a partial detail view of the control valve operating means for the diverting mechanism.

Fig. 4 is a sectional view of the control valve, taken on the line 4—4 of Fig. 3, and Fig. 5 is another sectional view of the control valve, taken on the line 5—5 of Fig. 4.

The embodiment of the invention illustrated comprises a dispensing apparatus housing 10 associated with an underground tank or reservoir 11 adapted to receive the liquid to be dispensed. In the particular embodiment illustrated this liquid, which is indicated by the reference numeral 12, may be gasoline or the like. The tank is provided with an inlet pipe 13 closed by a cap 14, and by means of which the gasoline is introduced into the underground tank.

An outlet pipe 15 leads from the tank, from a point near the bottom thereof, to the inlet side of a main liquid propelling pump 16, which may preferably be any suitable form of accurate gear pump. The outlet side of the pump is connected to a dispensing line 17, 18 which leads to a sight glass or other suitable flow indicator 19. The outlet side of the sight glass is connected to a flexible hose 20 which terminates in a dispensing nozzle 21 controlled by a hand operated valve 22 in the usual manner. The dispensing nozzle is adapted to be supported upon a hose hook 23 when not in use, as shown in Fig. 1.

The liquid propelling or dispensing pump 16 is adapted to be driven by a power device or electric motor 24 controlled by means of switch mechanism 25. This switch mechanism may be operated by means of operating devices 26 and 27 associated with the hose support 23 in the usual manner. The electric motor is adapted to operate constantly during the entire dispensing operation, after the dispensing nozzle has been removed from the hose hook and until it is returned thereto, whereas the dispensing pump is adapted to operate only while liquid is actually being dispensed and at such speed as will give the proper rate of liquid flow. To this end the motor is arranged to drive the pump through a power diverting mechanism comprising a differential gearing 28 supported by a suitable support bracket 29, and an associated control circuit 30 operated by the differential gearing and controlled by the liquid pressure in the dispensing line 17, 18. More specifically, the electric motor drives the main ring gear 31 of the differential by means of suitable beveled gearing 32 and 33. Ring gear 31 is secured to the housing of the differential and rotates therewith. The housing carries a stub shaft 34 upon which the differential gears 35 and 36 are mounted, in mesh with side gears 37 and 38. The lower side gear 37 is secured to a shaft which is adapted, by means of gearing 39, to drive the main dispensing pump 16, whereas the upper side gear 38 is secured to a shaft adapted, by means of gearing 40, to drive an auxiliary gear pump 41. It will be seen that by means of the differential gearing, the electric motor 24 may operate either the main dispensing pump 16 or the auxiliary pump 41, or both.

The auxiliary gear pump, which may be any form of inexpensive gear pump and preferably smaller than the dispensing pump 16, is arranged to circulate liquid, preferably oil, in the control circuit 30. This control circuit comprises a main pipe or conduit 42 controlled by a control valve 43, and a by-pass pipe 44 controlled by a by-pass valve 45. When the control valve 43 is open, the auxiliary pump is free to circulate the oil within the control circuit, but when the control valve is closed, the auxiliary pump is locked against operation. The by-pass valve 45 is a spring controlled relief valve and is adapted to be adjusted so that a small amount of the oil will be passed therethrough in the event the control valve 43 is quickly closed when the auxiliary pump is operating, to thereby absorb the shock of the locking operation.

The by-pass valve is illustrated in detail in Fig. 2, and the control valve and its operating mechanism is shown in Figs. 3, 4 and 5. Referring first to Fig. 2, the by-pass valve 45 comprises a housing 46 carrying a valve seat 47 against which a ball 48 is adapted to be urged by means of a compression spring 49. The tension in the spring, and consequently the pressure at which the by-pass valve may be set to open, is adjustable by means of an adjusting screw 50 which is adapted to adjust the length of the compression spring from its upper end.

As seen in Figs. 3, 4 and 5, the control valve 43 preferably comprises a valve casing 51 having a cylindrical central chamber adapted to receive a cylindrical valve core member 52. The core member is rotatable within the cylindrical chamber by means of an upstanding stem 53 which is formed as a part of the core member and is adapted to receive an operating gear 54. The valve casing 51 is provided with diametrically disposed diamond-shaped openings 55 leading to the central chamber, and the core member is provided with a rectangular-shaped opening 56 extending therethrough. When the core member is adjusted to the position shown in Figs. 4 and 5, with its bore 56 in alinement with the diamond-shaped openings 55 in the valve casing, unimpeded liquid communication is provided through the valve between the pipes 42. When the core member is rotated 90 degrees by means of the operating gear, the bore 56 of the core member becomes transversely disposed within the valve chamber and liquid communication is cut off. Due to the diamond-shape of the openings 55, the cutting-off of the fluid flow is gradual, imparting a metering characteristic to the construction. This characteristic may be changed by suitably changing or varying the contour of the diamond-shaped openings.

The mechanism for operating the control valve, as best shown in Figs. 1 and 3, comprises a pressure device 57 responsive to the pressure in the dispensing line 17, 18. Specifically this pressure responsive device comprises a casing 58 attached to and communicating with a pipe 59 leading from the dispensing line. Within the casing is a flexible bellows 60, which may be of any suitable construction. The bellows is secured, as by soldering or the like, at its lower end 61 to the casing 58, and at its upper end 62 to a plate member 63 attached to an operating rod 64 arranged for sliding movement within a bearing formed in the lower end of the casing 58. A compression spring 65 surrounds shaft 64 and normally urges the shaft and the plate 63 upwardly. At its lower end the rod 64 is connected by a suitable pin and slot connection with a lever 66 secured to a gear wheel 67 in geared engagement with the valve operating gear 54. As fluid pressure is introduced into the casing 58, the bellows 60 is collapsed against the force of spring 65 moving rod 64 and lever 66 from the full line position to the dotted line position, as shown in Fig. 3. When the lever 66 is in its full line position, the control valve is closed. When the lever is in its dotted line position, the control valve is open.

The main liquid propelling or dispensing pump 16 is arranged to actuate the registering or recording elements of the apparatus by means of a gearing 68 driven by the pump, and a shaft 69. By means of gearing 70, 71, 72 and 73, the shaft 69 is adapted to operate a volume register 74. The shaft 69 is also adapted to operate a total price or cost register 75 by means of gearing 76 and 77, the gearing 76 being adapted to be driven from the shaft. Interposed between the shaft 69 and the gearing 76 is a suitable variator mechanism 78 by which the gear ratio between the shaft and the cost register 75 may be changed whereby to compute the cost of the dispensed gasoline at different unit prices. This variator mechanism may be of any suitable form of change speed gearing. The registers and their operating parts may likewise be of any suitable desired type, for example, of the type shown in the patent to E. J. Svenson, for Liquid handling mechanism, Patent No. 2,117,750, dated May 17, 1938.

In operation, the liquid to be dispensed, as gasoline, is introduced into the underground storage tank or reservoir by means of the filling pipe 13. During this operation the displaced air within the tank is exhausted through the air release pipe 80 exhausting underneath the dispensing apparatus. To effect a dispensing operation, the operator removes the dispensing nozzle from the hose hook 23 and manipulates switch 25 to start the electric motor 24 which thereafter runs constantly during the dispensing operation. As a result of the previous dispensing operation, fluid pressure has been built up in the dispensing line 17, 18. This fluid pressure maintains the bellows 60 collapsed against the pressure of spring 65 so that the lever 66 is in its dotted line position, Fig. 3, and the control valve 43 is open. Accordingly as the motor 24 is started and while the nozzle valve 22 still remains closed, auxiliary pump 41 is operated through the differential mechanism, and the main dispensing pump 16 remains stationary. The auxiliary pump circulates oil in the closed circuit through the open valve 43. The valve being in fully open position, there is no impedance to the flow of the oil within the closed circuit, and no driving force or drag is transmitted back through the differential to the dispensing pump 16. In other words, even though the motor 24 is operating, no driving force is transmitted to the dispensing pump.

As the operator now opens the nozzle valve 22 to dispense liquid, the pressure within the dispensing line 17, 18 is relieved. This causes the relief of the fluid pressure within the pressure responsive device 57, and the compression spring 65 operates to expand the bellows 60, closing control valve 43. As the control valve closes, the circulation of the oil within the closed control circuit 30 is stopped. This locks the auxiliary pump 41 from operation and the driving force from the motor 24 is immediately transmitted to the dispensing pump 16. The dispensing pump operates and liquid is dispensed from the nozzle 21.

In view of the fact that the control valve 43 may be closed rapidly by the relief of pressure within the dispensing line 17, 18, the by-pass valve 45 is provided to relieve the shock upon the pumps and the differential mechanism as the auxiliary pump is stopped. To this end the adjusting screw 50 of the by-pass valve is so set that a small quantity of the oil will be circulated through the by-pass line 44 as the control valve 43 is first closed. The adjustment of screw 50 is such that circulation through by-pass line 44 is normally prevented, and the by-pass valve opens only for a very short time upon the rapid closing of control valve 43, to prevent any shock to the operating parts of the system.

When it is desired to cut off the flow of the dispensed liquid, the operator closes valve 22. This builds up pressure within the dispensing line 17, 18, causing the opening of control valve 43. The dispensing pump 16 stops and the auxiliary pump 41 begins its operation to circulate the oil freely within the closed control circuit. The operator may open or close the nozzle valve 22 at will to accurately control the quantity of liquid dispensed, and each time as the nozzle valve is closed, the driving force upon the dispensing pump 16 is immediately relieved by reason of the opening of control valve 43. Accordingly there is no tendency to drive the dispensing pump after the flow of the dispensed liquid has been stopped by the nozzle valve. Accuracy is assured and maintained.

Should the operator desire to dispense liquid at some fractional rate of flow, he closes nozzle valve 22 partially. This causes a partial building up of pressure within the dispensing line 17, 18, resulting in a partial operation of the pressure control device 57 and in a partial opening of control valve 43. Under these circumstances, therefore, both pumps 16 and 41 will be operated at reduced speed from the power source or motor 24. Equilibrium within the system is always maintained, and the rate of liquid flow from the dispensing nozzle will be proportional to the degree of opening of the nozzle valve. The tension of spring 65 is such that the bellows will not be collapsed by normal dispensing pressures in the line 17, 18, as when the nozzle valve is fully opened. However, if the nozzle valve is partially closed, a pressure slightly above normal is produced in the dispensing line, and this increased pressure causes the partial opening of control valve 43. During fractional rate dispensing flow, the pressures within the dispensing line are built up only very slightly above normal. Accordingly the dispensing pump 16 operates against a substantially constant pressure at all rates of delivery, to further maintain and assure accuracy. Inasmuch as the movements of the dispensing pump 16 are thus maintained accurately proportional to the actual volume of liquid dispensed, whether the flow be at full rate, fractional rate or intermittent, the dispensing pump may be directly connected to the register devices of the apparatus. Metering mechanisms or devices are eliminated.

When the dispensing operation is completed, the operator restores the dispensing nozzle to the hose hook 23 and shuts off the electric motor.

It is to be noted that there is no by-passing or other turbulence of the column of dispensed liquid from the time it enters pipe 15 from the underground tank until it is dispensed from the nozzle 21. The dispensing line is sealed against the admittance of air so that there is no chance for any air to be mixed with the gasoline within the dispensing apparatus after it leaves the underground tank. Accordingly the underground tank can be used as an air eliminator, the air which separates from the gasoline within the tank being exhausted by the air release pipe 80. Auxiliary air release devices such as provided in conventional dispensing apparatus between the pump and the meter become unnecessary and are eliminated.

It is obvious that various changes may be made in the specific embodiment of the invention set forth for purposes of illustration without departing from the spirit thereof. For example, various suitable forms of pumps and differential mechanisms may be used, although preferably the intermittently operable parts of the pumps and differential mechanism are made of light weight to minimize inertia. The invention is therefore not to be limited to the specific embodiment shown and described, but only as indicated in the following claims.

The invention is hereby claimed as follows:

1. A liquid dispensing apparatus comprising a source of liquid supply, a dispensing nozzle adapted to be opened and closed to control the flow of liquid through the nozzle, a dispensing line connecting the source of supply and the nozzle, a pump for propelling liquid through the dispensing line and nozzle, a power motor, means comprising a differential gearing connecting the motor and the pump, and loading means connected to the differential gearing for causing the differential gearing to drive and stop driving the pump when the nozzle is opened and closed.

2. A liquid dispensing apparatus comprising a source of liquid supply, a dispensing line connected to said source of supply, a power device, a pump for propelling liquid through said dispensing line, power diverting connections coupled to the power device and the pump, and a control fluent circulating system coupled to said power diverting connections for controlling the application of power to the pump and its diversion from the pump.

3. A liquid dispensing apparatus comprising a source of liquid supply, a dispensing line connected to said source of supply, a power device, a pump for propelling liquid through said dispensing line, power diverting connections coupled to the power device and the pump, a control fluent circulating system coupled to said power diverting connections for controlling the application of power to the pump and its diversion from the pump, and register mechanism coupled to the pump for operation in synchronism therewith.

4. A liquid dispensing apparatus comprising a source of liquid supply, a dispensing line connected to said source of supply and provided with a flow controlling dispensing nozzle, a power device, a pump for propelling liquid through said dispensing line, power diverting connections coupled to the power device and to the pump, and a control fluent circulating system including means controlled by the dispensing nozzle and means coupled to the power diverting connections for causing operation of the pump at variable speeds with respect to the speed of operation of the power device.

5. A liquid dispensing apparatus comprising a source of liquid supply, a flow controlling dispensing nozzle, a dispensing line connecting the source of supply to the nozzle, a pump for propelling liquid through the dispensing line, a power motor, fluent forcing means, means comprising a differential gearing connecting the motor to the pump and the motor to the fluent forcing means, and a control fluent circulating system through which fluent material is forced by said fluent forcing means for controlling the driving of the pump by the motor.

6. A liquid dispensing apparatus comprising a source of liquid supply, a flow controlling dispensing nozzle, a dispensing line connecting the source of supply to the nozzle, a pump for propelling liquid through the dispensing line, a power motor, fluent forcing means, means comprising a differential gearing connecting the motor to the pump and the motor to the fluent forcing means, a control fluent circulating system through which fluent material is forced by said fluent forcing means for controlling the driving of the pump by the motor, and means in said control fluent circuit operatively controlled by the flow controlling nozzle for controlling said control fluent circuit.

7. A liquid dispensing apparatus comprising a source of liquid supply, a dispensing line connected to said source of supply, a power device, a pump for propelling liquid through said dispensing line and connected to the power device for operation thereby, and means for disabling the operative connection between the power device and the pump, said means including a control fluid circulating system, and means controlling the circulation of the fluid in said control system for controlling the disabling means.

8. A liquid dispensing apparatus comprising a source of liquid supply, a dispensing line connected to said source of supply, a power device, a pump for propelling liquid through said dispensing line connected to the power device and adapted to be operated thereby, means for disabling the operative connection between the power device and the pump, and valve means controlled by the liquid pressure in the dispensing line for controlling the disabling means.

9. A liquid dispensing apparatus comprising a source of liquid supply, a dispensing nozzle having a control valve, a dispensing line connecting the nozzle and source of supply, a power device, a pump for propelling liquid through the dispensing line connected to the power device and operated thereby, and means for disabling the operative connection between the power device and pump, said disabling means including a control fluent circulating system controlled by the nozzle control valve for controlling circulation of fluent material through the system to control the disabling means.

10. A liquid dispensing apparatus comprising a source of liquid supply, a dispensing line connected to said source of supply, a power device, a pump for propelling liquid through said dispensing line connected to the power device and adapted to be operated thereby, and means for disabling the operative connection between the power device and the pump, said disabling means comprising a fluid control circuit, an auxiliary pump for propelling fluid through said circuit, and a control valve for controlling the movements of the fluid within the circuit.

11. A liquid dispensing apparatus comprising a source of liquid supply, a dispensing nozzle having a control valve, a dispensing line connecting the nozzle and source of supply, a power device, a pump for propelling liquid through the dispensing line connected to the power device and operated thereby, means for disabling the operative connection between the power device and the pump, said disabling means comprising a fluid circuit, an auxiliary pump for circulating fluid in said circuit, and a circuit control valve for controlling the flow of fluid within said circuit, and means operated by the nozzle control valve for controlling the operation of the circuit control valve.

12. A liquid dispensing apparatus comprising a source of liquid supply, a dispensing line connected to said source of supply, a power device, a pump for propelling liquid through said dispensing line connected to the power device and adapted to be operated thereby, register mechanism driven by the pump, and means for diverting the power output of said power device from the pump, said diverting means comprising a differential gearing arranged in the driving connections between the power device and the pump, a second pump connected to the differential gearing, and a control circuit through which fluid is circulated by said second pump.

13. A liquid dispensing apparatus comprising a source of liquid supply, a dispensing line connected to said source of supply, a power device, a pump for propelling liquid through said dispensing line connected to the power device and adapted to be operated thereby, means for diverting the power output of said power device from the pump, said diverting means comprising a differential gearing having a first driving connection with the power device, a second driving connection with said pump and a third driving connection with an auxiliary pump, a liquid control circuit connected to the auxiliary pump and through which liquid is circulated by said auxiliary pump, and a control valve in said control circuit for controlling the flow of liquid therein.

14. A liquid dispensing apparatus as defined in claim 13 wherein means is provided operated by the liquid pressure in the dispensing line for controlling the operation of said control valve.

15. A liquid dispensing apparatus comprising a source of liquid supply, a dispensing line connected to said source of supply, a power device, a pump for propelling liquid through said dispensing line connected to the power device and adapted to be operated thereby, means for diverting the power output of said power device from the pump, said diverting means comprising a differential gearing having a first driving connection with the power device, a second driving connection with said pump and a third driving connection with an auxiliary pump, a liquid control circuit connected to the auxiliary pump and through which liquid is circulated by said auxiliary pump, a first control valve in said control circuit for controlling the flow of liquid therethrough, and a second control valve arranged in the control circuit in by-pass relation to the first control valve.

16. A liquid dispensing apparatus comprising a source of liquid supply, a dispensing nozzle, a dispensing line connecting said nozzle and source of supply, a dispensing pump for propelling liquid through the dispensing line, an electric motor, an auxiliary pump, a differential gearing having a first operating connection connected to the motor, a second operating connection connected to the dispensing pump and a third operating connection connected to the auxiliary pump, a liquid control circuit connected to the auxiliary pump and through which liquid is circulated by said auxiliary pump, a control valve in the control circuit, and a bellows device for operating the control valve, said bellows being controlled by the liquid pressure within the dispensing line.

RICHARD R. TREXLER.